Oct. 1, 1940.  G. H. ENNIS  2,216,189

METHOD AND APPARATUS FOR INSERTING CORES IN CABLES

Filed Oct. 22, 1938  6 Sheets-Sheet 1

INVENTOR,
GEORGE H. ENNIS
BY
ATTORNEY

Oct. 1, 1940.  G. H. ENNIS  2,216,189
METHOD AND APPARATUS FOR INSERTING CORES IN CABLES
Filed Oct. 22, 1938  6 Sheets-Sheet 2

INVENTOR
GEORGE H. ENNIS
BY
ATTORNEY

Patented Oct. 1, 1940

2,216,189

UNITED STATES PATENT OFFICE 2,216,189

METHOD AND APPARATUS FOR INSERTING CORES IN CABLES

George H. Ennis, Long Beach, Calif., assignor of one-half to Robert V. Funk, Long Beach, Calif.

Application October 22, 1938, Serial No. 236,595

22 Claims. (Cl. 57—1)

My present invention relates to a simple and economical means and method for placing a core in and/or removing an old core from a completed cable, and relates in particular to an improved device and method for replacing a core of a cable with another core as a continuous operation and without the necessity of disassembling or unwinding the strands of the cable on which the operation is performed.

Although my invention has many uses, such as the replacing of a worn hemp core of a cable with a new hemp core or the building up of an old core, it is of essential utility in replacing the existing core of a cable with a core embodying one or more electrical conductors. In certain types of well surveying, for example, the testing of an oil well to determine by known electrical methods the point of entry of water leakage into the well, the testing device is lowered into the well by means of a suitable cable which preferably carries an electrical conductor with suitable insulation in its core. For this work it is customary to obtain the required type of cable, with an electrical conductor core, from the cable manufacturers. Owing to the great depths to which oil wells are now being drilled, cables for this purpose must be often 10,000 feet in length. Breakage of the electrical conductor in the core, or breakdown of the insulation of the electrical conductor, results in the ruin of the cable for this purpose. My present invention makes it possible to expeditiously remove the old core of the cable and to replace the same with a new core which ordinarily lasts much longer than the initial core of the cable for the reason that the cable has been broken-in by service; that is to say, it has been stretched in being used, and therefore the stretch applied to the new core when the reclaimed cable is placed in use will not be as great as the stretch to which the original core was subjected. Likewise, my present invention makes it possible to remove the customary hemp core from a cable and to replace the same with a core containing an insulated conductor. Accordingly, a sand line which has been stretched or broken-in by service may be converted to an electrical cable suitable for use in conjunction with electrical well testing or surveying devices.

It is an object of the invention to provide a device having a guide or a support for a cable with a spreader head adapted to be passed into the structure of the cable from a side thereof so as to spread two or more strands of the cable in a manner to form an opening leading into the cable from the side and communicating with the core space of the cable and having means for inserting a core in the cable and/or removing a core from the cable through this side opening which the spreader head has formed in the cable. The invention includes means for providing relative lengthwise and rotary movement of the cable and the spreader head so that the spiral or helix defined by the strands of the cable will be followed.

It is an object of the invention to provide a device of the character set forth in the preceding paragraph wherein the cable is moved continuously through the cable guide and the spreader head or core inserting and removing means is given a rotary movement around the axis of the cable in such manner that the spiral or helix of the cable will be followed.

It is an object of the invention to provide in a device of the above character a core support having rotation relative to the cable guide, this rotation being of such character that the core will not be twisted as the result of the operation performed by the device.

It is a further object of the invention to provide a device for inserting and/or replacing a core in a cable wherein core supporting means are disposed externally of the cable guide so as to revolve through orbits around the cable guide, there being means for giving the cable support such relative rotation that a twist is not applied to the core which will prevent its lying properly in the cable.

Further objects and advantages of the invention will be brought out in the following part of the specification.

Referring to the drawings which are for illustrative purposes only.

Figure 1:
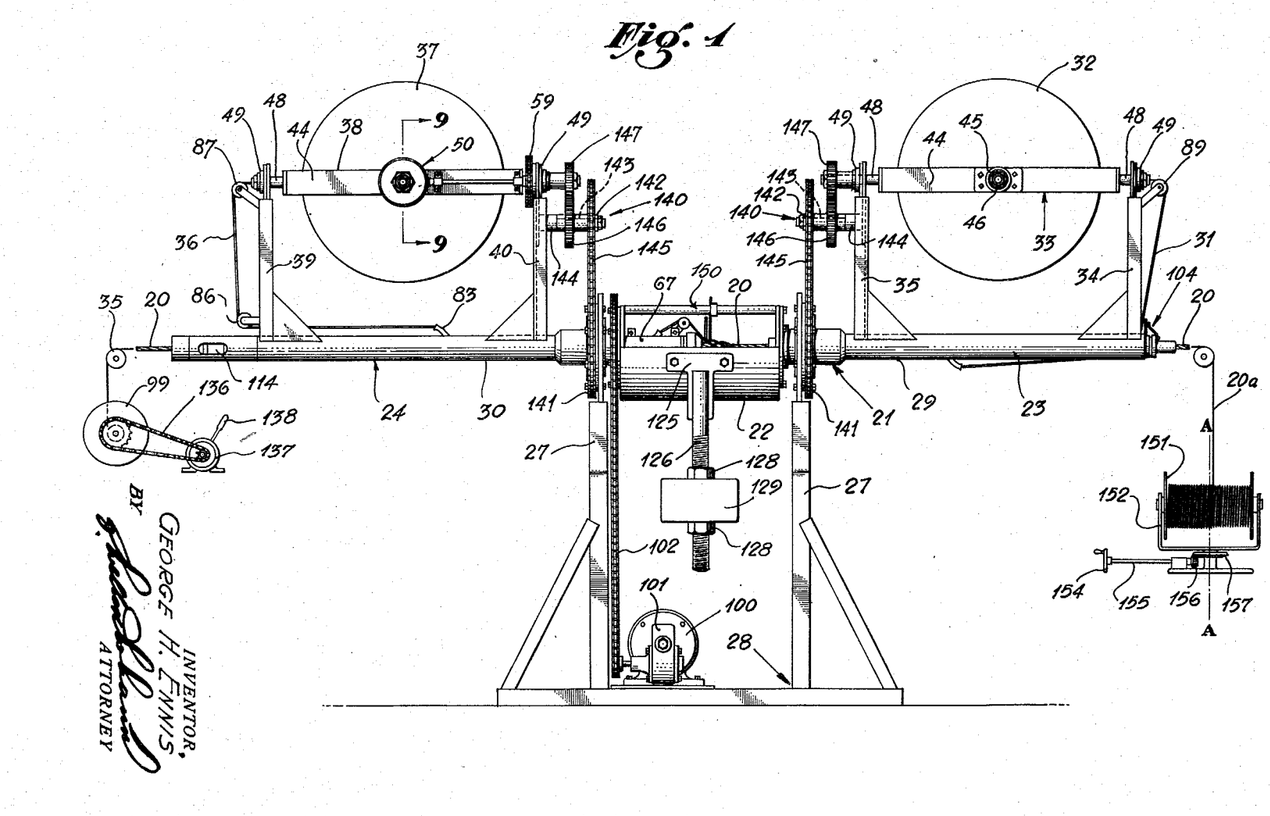
Fig. 1 is a side elevation of a preferred embodiment of my invention, with cable feed and cable take-off means shown to reduced scale at the ends thereof.
Figures 2, 4, 5:
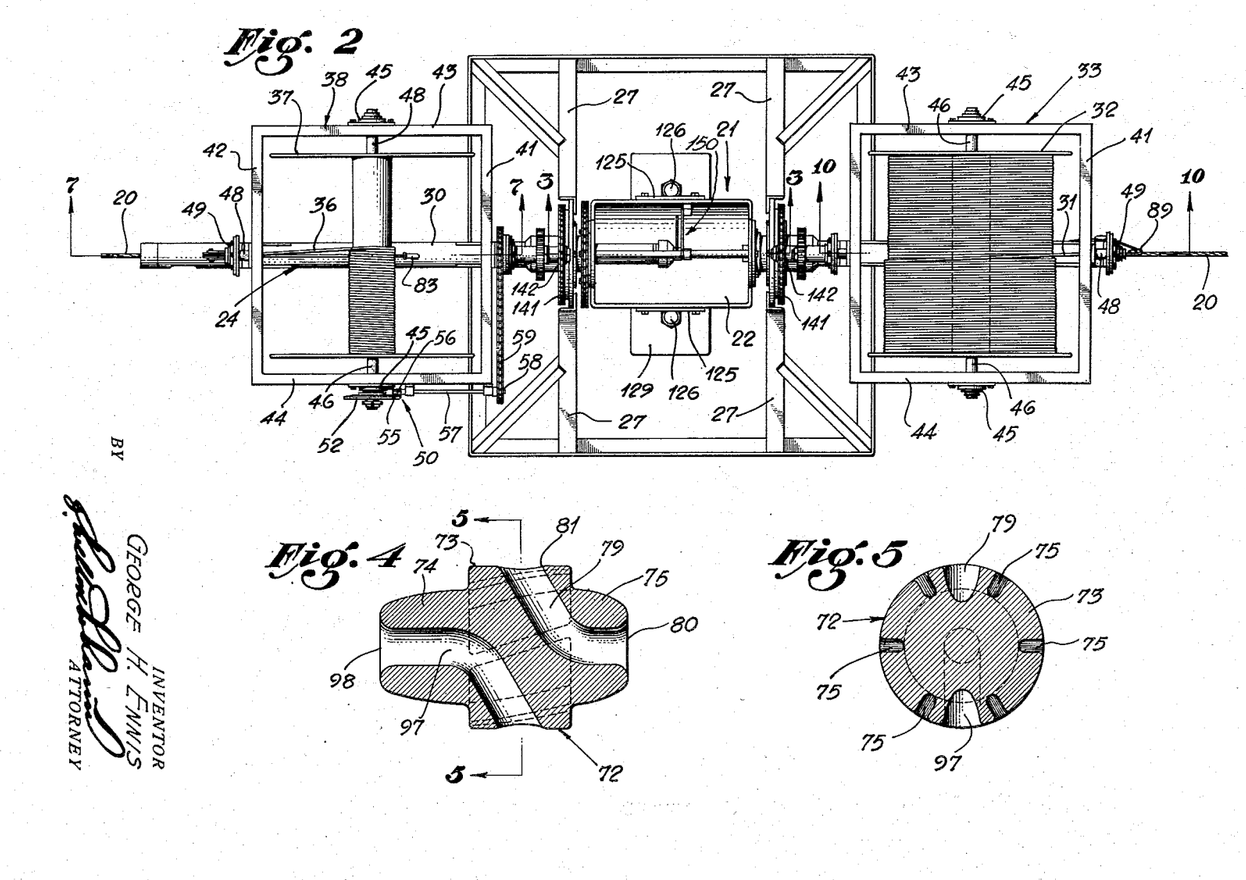
Fig. 2 is a plan view of the device shown in Fig. 1.
Fig. 4 is an enlarged section through the spreader head of the device taken on a plane extended vertically and longitudinally through the spreader head.
Fig. 5 is a cross-section through the spreader head taken as indicated by the line 5—5 of Fig. 4.
Figure 3:
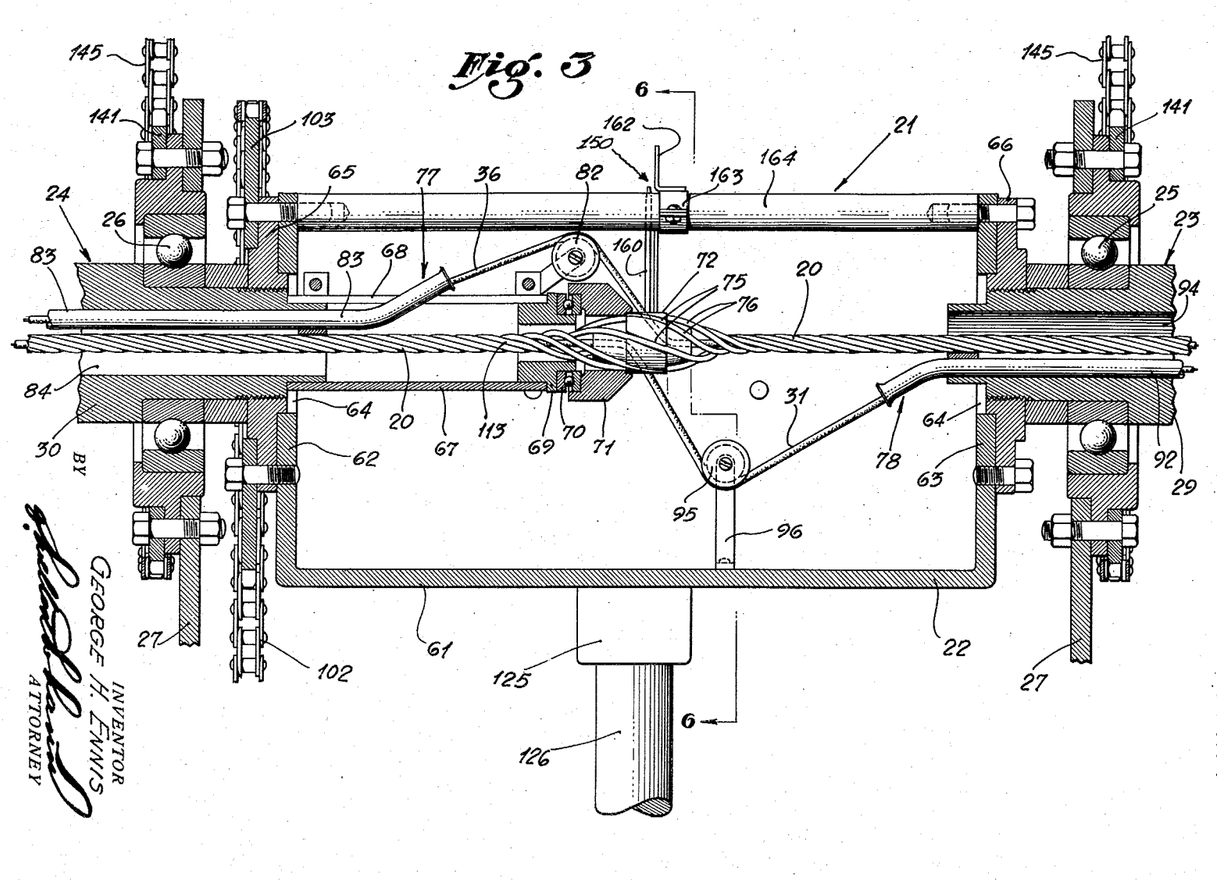
Fig. 3 is an enlarged fragmentary section taken as indicated by the line 3—3 of Fig. 2.

In Figs. 1, 2, and 3 of the drawings, I show a cable 20 extended through a cable guide means 21, so called for the reason that it defines the path through which the cable is extended during the time it is being worked on. This cable guide means 21 includes end sections and means for causing said end sections to rotate in unison, the same being shown as a central or intermediate section 22 of open-work character. The cable guide means 21 is supported for rotation around the axis of the cable 20 by bearings 25 and 26 carried by the posts 27 of a support 28. These posts 27 are preferably placed so as to support the bearings 25 and 26 at the inner ends of the tubes 29 and 30 of which the end sections 23 and 24 are formed.

The tube 29 carries means for supporting a new core 31, such supporting means including a drum or spool 32, a cradle 33 which supports the spool 32, and radially projecting brackets 34 and 35, the inner ends of which are secured to the tube 29 preferably by welding.

Supporting means for an old core 36 is provided on the tube 30 of the end section 24, this old core supporting means comprising a drum or spool 37, a cradle 38 to carry the drum 37, and brackets 39 and 40 which are essentially the same as the brackets 34 and 35, the inner ends of the brackets 39 and 40 being secured to the tube 30 in radially projecting position. As shown in Fig. 2, the cradles 33 and 38 consist of rectangular frames each having end members 41 and 42 and side members 43 and 44. The side members 43 and 44 carry bearings 45 to receive the trunnions 46 which project axially from the spools 32 and 37. Each end member 41 and 42 has a tubular trunnion 48 projecting outward in horizontal planes into bearings 49 carried at the outer ends of the brackets 34, 35, 39, and 40. I also provide means for giving relative rotation to the core supports. This relative rotation of the core supports represented by the spools 32 and 37 ond the cable guide means 21 I refer to as orienting the core supports so as to properly orient the cores, that is to say, so as to give the cores such rotation as may be required to cause them to lie properly. In the general practice of the invention the core comprises an insulated conductor, which conductor is itself a small stranded cable in which the strands extend through spiral paths. It is believed that when radial compression is placed on the core, the spiral cable within the core is compressed so as to change the angle of the spiral of its strands, the result being that that portion of the core which has not yet entered the cable is caused to continuously twist or rotate on its own axis. To compensate for this, it is necessary to orient the entering core 31, and likewise I have found that it is necessary to orient the old core 36 relative to the cable as it is taken therefrom in order to cause it to wind without material twisting on the take-off spool 37.

To rotate the cradles 33 and 38, and the spools 32 and 37 carried thereby, relative to the supports represented by the posts 34, 35, 39, and 40, substantially identical drive means 140 are provided for the cradles 33 and 38, each of such drive means comprising stationary sprockets 141 mounted coaxially on the supports 27, and sprockets 142 keyed on shafts 143 carried by bearings 144 supported on the arms 35 and 40 near the trunnions 48. Chain loops 145 extend over the sprockets 141 and 142 to drivably connect the same so that when the sprockets 142 are revolved through circular orbits around the axis of the cable guide 21, these sprockets 142 and the shafts 143 will be caused to rotate. Pinions 146 are fixed on the shafts 143 and engage gears 147 which are fixed on the adjacent trunnions 48. The ratio of the pinions 146 to the gears 147, in the present use of the device is 1¼ to 1; but this driving ratio may be readily changed as may be required by different types of cores. When the spool supports revolve in forward or clockwise direction so as to follow the helix of the cable 20, the spools 32 and 37 are bodily rotated in clockwise direction on the axes defined by the trunnions 48.

Figures 7, 8, 9:
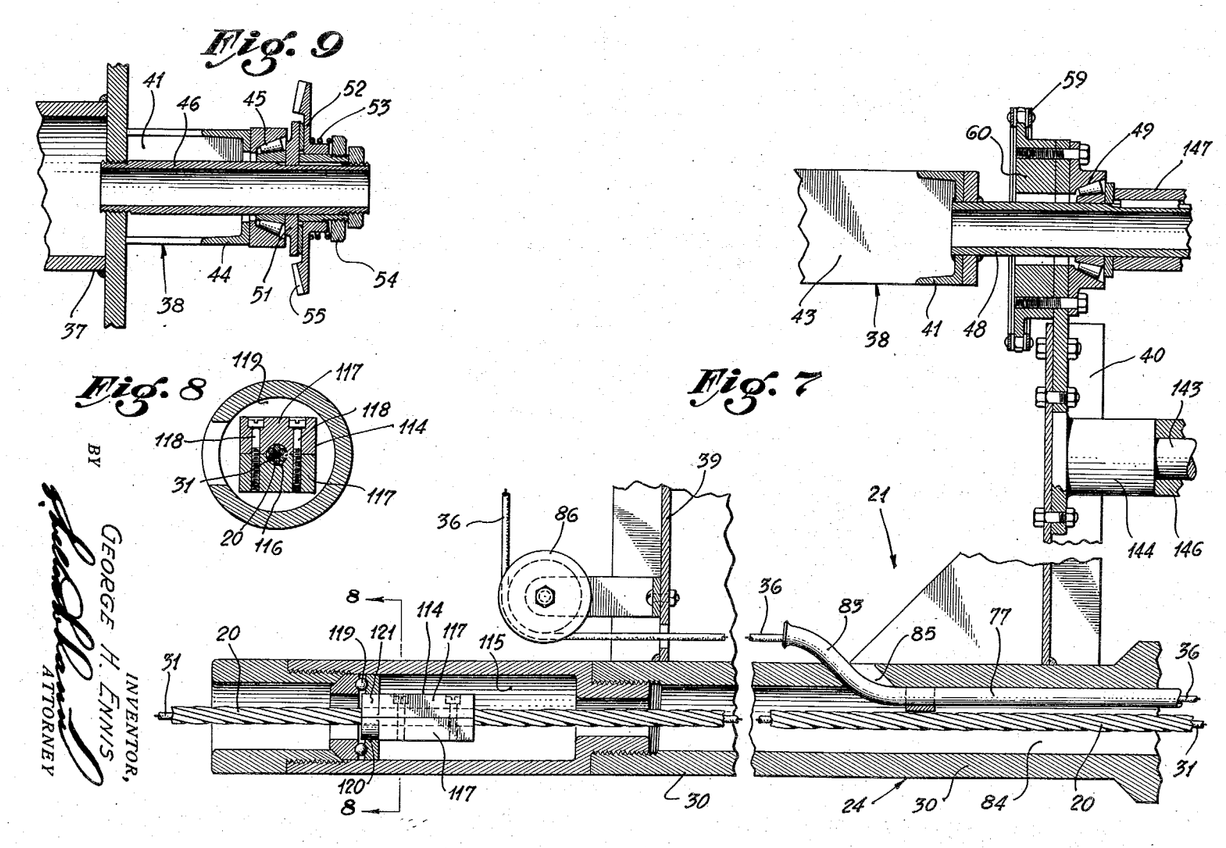
Fig. 7 is an enlarged fragmentary section taken as indicated by the line 7—7 of Fig. 2.
Fig. 8 is a cross-section taken as indicated by the line 8—8 of Fig. 7.
Fig. 9 is an enlarged fragmentary cross-section taken on a plane represented by the line 9—9 of Fig. 1 and showing a part of the friction drive means for the old core spool.

So that the old core 36 will be continuously wound upon the spool 37, I provide for the spool 37 a friction drive means 50 as shown in Figs. 1, 2, 7, and 9. This friction drive means 50 includes a plate 51, Fig. 9, keyed on the outer portion of the trunnion 46 which is projected through the bearing 45 carried by the side member 44 of the cradle 38 and a driven plate 52 which is rotatable relative to the plate 51 and is urged toward the plate 51 by a spring 53 compressed by a nut 54. A bevel gear 55 is formed on the outer portion of the plate 52 and the same in engaged by a bevel pinion 56, Fig. 2, fixed on the end of a shaft 57 extending along the side member 44 to the right end thereof. A sprocket 58, fixed on the end of the shaft 57, is engaged by a chain 59 which passes over a larger sprocket 60 rigidly secured to the upper end of the bracket 40, as best shown in Fig. 7, in concentric relation to the bearing 49 at the outer end of the bracket 40. As relative rotation of the cradle 38 and the cable guide means 21 occurs, the chain 59, acting through the sprocket 58, will rotate the shaft 57 and the bevel pinion 56 will drive the bevel gear 55 so that a frictional driving force will be transmitted from the plate 52 to the plate 51 to rotate the spool 37 so as to constantly take up the slack in the old core 36.

Figure 6:
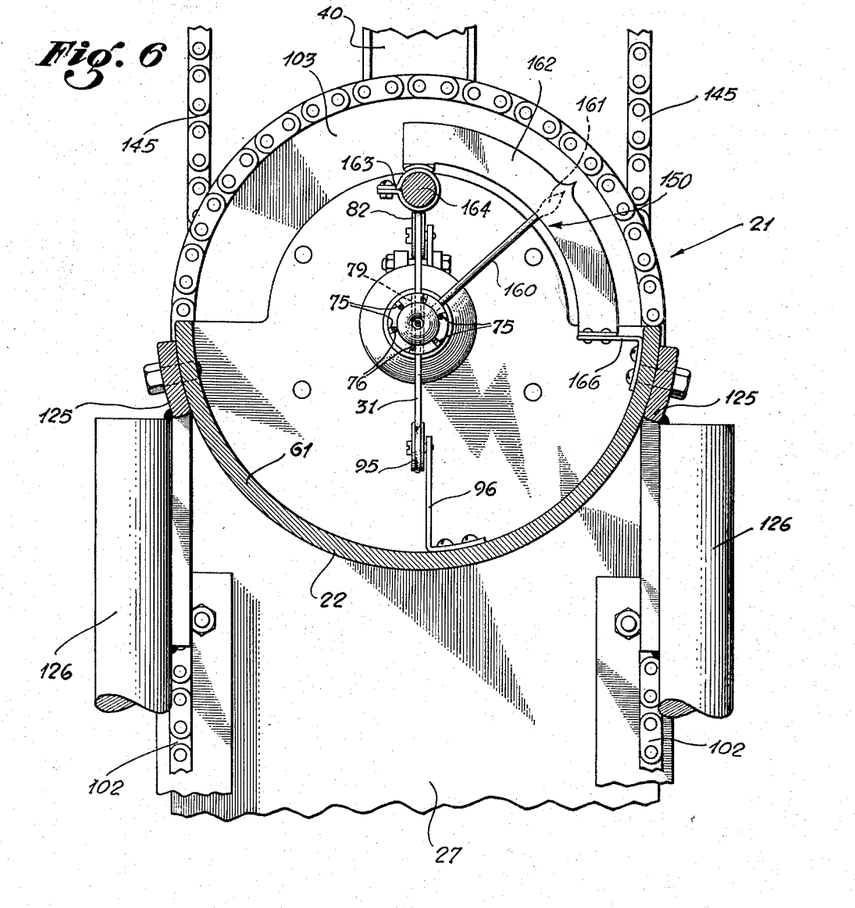
Fig. 6 is a fragmentary section taken as indicated by the line 6—6 of Fig. 3.

The central section 22, as shown in Figs. 3 and 6, includes a semi-cylindrical wall 61 with end walls 62 and 63 with coaxial openings 64 and are connected to the tubular members 30 and 29 by flanges 65 and 66. A supporting tube 67, having a longitudinal slot 68, is secured to the inner end of the tube 30 so as to project into the central section 22 so as to support a thrust bearing fitting 69. The fitting 69 carries a thrust bearing 70 which supports a holder 71 for a spreader head 72 comprising, as shown in Fig. 4, an intermediate portion 73, a slightly tapered front extension 74 which projects into the holder 71, and a shorter rear extension 75. The spreader head 72 has spiral guides or openings 75 preferably in the form of channels cut in the cylindrical intermediate portion 73 to receive the individual strands 76 of the cable 20 when the strands 76 are spread and the head 72 is placed in the opening in the cable resulting from the spreading of the strands 76, as shown in Fig. 3. The channels 75 are preferably evenly spaced and between adjacent strands 76 side openings lead into the interior of the cable from a side of the cable. It is through such side openings that the old core 36 is removed from the cable 20 and the new core 31 is inserted in the cable to replace the old core which has been removed. To provide side openings in the cable through which the old and new cores 36 and 31 may be passed, the spreading of the strands of the cable need not be very great. In the present disclosure I have shown a head 72 which spreads the strands 76 to such an extent that opposite strands will be spaced apart a distance approximately three times the diameter of the cable 20.

Between the interior space enlargement of the cable 20 formed by the head 72 and the core supporting means represented by the spools 32 and 37 I provide core guide means 77 and 78, respectively, for the old and new cores 36 and 31. The old core guide means 77 includes, as shown in Fig. 4, an opening 79 leading from the rear end 80 of the spreader head 72 to the upper side 81 thereof, a sheave 82 supported above the bearing 70, a tube 83 which leads through the slot 68 in the tube 67 into the opening 83 of the tube 30 and then out through an opening 85 intermediate the end of the tube 30, as shown in Figs. 1 and 7, a sheave 86 mounted on the lower portion of the bracket 39, and a sheave 87 mounted on the outer portion of the bracket 39, as shown in Fig. 1. The old core 36 passes through the opening 79 of the spreader head 72, as shown in Fig. 3, over the sheave 82, through the guide tube 83, and over sheaves 86 and 87, to pass through the hollow trunnion 48 at the left end of the cradle 38 to the core of the spool 37, as shown in Fig. 2.

Figure 10:
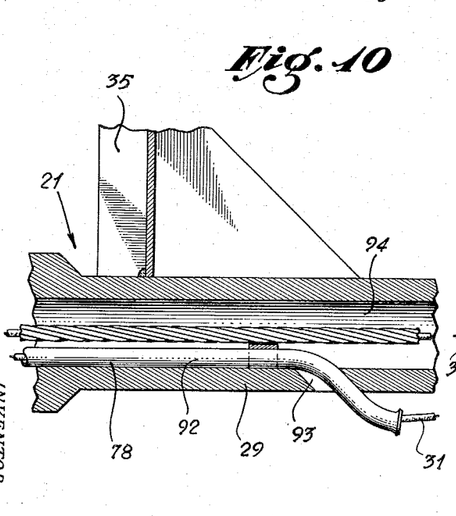
Fig. 10 is an enlarged fragmentary cross-section taken as indicated by the line 10—10 of Fig. 2.
Figure 11:
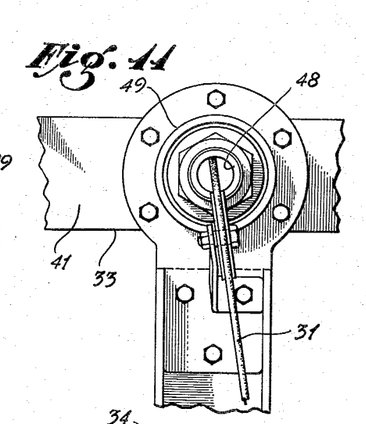
Fig. 11 is a fragmentary face view looking toward the right end of Fig. 10.

The new core 31, as shown in Figs. 1 and 2, passes from the spool 32 through the hollow trunnion 48 at the right end of the cradle 33 and is carried to the interior space enlargement formed in the cable 20 by the spreader head 72 by the new core guide means 78 which consists of a sheave 89 mounted on the outer end of the bracket 34, as shown in Fig. 1, a sheave 90 mounted by means of a bracket 91 on the right end of the tube 29, as shown in Figs. 10 and 11, a guide tube 92 which leads through an opening 93, Fig. 10, in the wall of the tube 29, and through the axial opening 94 of the tube 29 to the forward end thereof, as shown in Fig. 3, a sheave 95 held by a bracket 96 in the intermediate section 22 in a plane below the spreader head 72, and an opening 97 in the spreader head 72, which opening 97 leads from the lower side of the cylindrical portion 73 to the front end 98 of the spreader head 72, as shown in Fig. 4.

In the preferred practice of the invention, the spiral of the channels 75 in the spreader head 72 is nearly the same as that of the strands in the unexpanded portion of the cable 20, and during the operation of the device such relative rotation of the spreader head 72 and the cable 20 is maintained as to cause the spreader head 72 to follow the spiral defined by the strands of the cable 20. It is most convenient in the practice of my method to move the cable 20 forward or leftward through the device, without material rotation of the cable around its longitudinal axis, and to rotate the spreader head 72 and the core guide means 77 and 78 in such a manner that the spiral of the cable will be followed. To pull the cable 20 through the device at a substantially constant speed, I have diagrammatically shown a power driven drum 99 to which the finished cable is carried over a sheave 135. This drum 99 is shown connected by a chain 136 to a variable speed drive means 137 having a control 138.

Figure 12:
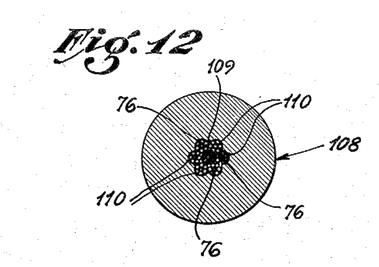
Fig. 12 is an enlarged cross-section taken as indicated by the line 12—12 of Fig. 10.

To rotate the cable guide means 21 and the parts thereto attached, I provide a motor 100 and a variable speed transmission 101 drivably connected as by means of a sprocket with a chain 102 which runs over a sprocket 103 which is bolted on the flange 65, as best shown in Fig. 3. A further feature of the invention consists in an index means 104, Figs. 1, 10, and 11, to serve as a guide for the control of the speed at which the cable guide means 21 must be rotated, or of the relative speed at which the cable 20 must be carried forward through the device, in order that the spreader head 72 shall follow the spiral of the axially moving cable 20. This index means 104 includes an index plate 105 secured to the right end of the tube 29 by means of a bushing 106, an index pointer 107, and means 108 for causing the pointer 107 to rotate around the forwardly moving cable 20 in accordance with the rotation of the strand spirals around the cable. In its simple form this means 108 comprises a sleeve having an opening 109 defined by helical grooves 110 corresponding in number to the strands of the cable 20 and cooperating with the exposed portions of these strands 76, as shown in Fig. 12, in the manner of an internal screw thread with an external screw thread so that as the cable moves axially the member 108 will be held against bearing means 111 and will be caused to rotate around the cable in the manner of a multi-threaded nut around a companion multi-threaded screw. Owing to this thread-like engagement of the member 108 with the cable 20, the member 108 will follow the spiral defined by the strands of the cable, and in order to cause the spreader head 72 to follow the same spiral, but at a different point along the cable, it is only necessary that the cable guide means 21 shall be rotated at the same speed as the pointer 107, this being done by causing the cable guide means 21 to rotate at such speed that the space demarcated on the plate 105 by lines 112 will be kept in substantially centralized relation to the pointer 107.

After leaving the spreader head 72, as shown in Fig. 3, the cable strands 76 tend to resume their normal positions, as indicated at 113, and to grip the new core 31 which is contained in the core space of the cable 20. However, before the cable 20 leaves the device, it is passed, as shown in Fig. 7, through a sizing or compressing die 114 disposed in a chamber 115 at the left end of the tube 30. This die 114 has a sizing opening 116 through which the cable 20 is pulled and is preferably formed of a pair of cooperating halves 117 secured together by means of screws 118. Axial movement of the die 114 is prevented by a thrust bearing 119 having an opening 120 to receive the rounded end 121 of the die 114. The die 114 remains substantially non-rotative and very little rotational force is imparted thereto by the rotation of the cable guide means 21, since the end thrust of the die 114 is taken by the thrust bearing 119 which is preferably of anti-friction type.

By means of plates 125 bars 126 are connected to the intermediate section 22 of the cable guide means 21 so as to project oppositely from the brackets 34 to 40 inclusive, these bars being threaded to receive adjusting nuts 128, for positioning a counterweight 129 which is slidable on the bars 126. The spools 32 and 37 are of such size that greater than 10,000 feet of core may be wound thereon. The invention also provides means for orienting the cable 20 and an indicator 150, Figs. 1, 3, and 6, for showing whether a proper relation is being maintained between the speed of movement of the cable 20 and the rotation of the cable guide so that the spreader head 72 will follow the helix of the cable.

As shown schematically in Fig. 1, cable 20 is taken from a spool 151 mounted in a yoke 152 so that the spool 151 may be rotated on an axis A—A which is transverse to the axis of the spool, such rotation of the spool rotating the front or entering end 20a of the cable 20 around its own axis. Means for rotating the yoke 152 on the axis A—A is shown in the form of a handle 154 to transmit rotation through a shaft 155 to a bevel pinion 156 which engages a gear 157 connected to the yoke 152. This orienting means for the cable 20 also constitutes a means whereby a constant twist may be applied to the entering end of the cable so that the adjacent turns of the cable strands will lie close together. In the practice of the invention it is preferable to take the cable 20 from the device end on to the spool 99 without rotation of the cable around its axis. If the "lay" of the cable being handled is relatively tight the orienting means for the entering end of the cable may be employed merely for the purpose of compensating for the ordinary twists which occur in cable during its spooling. However, preferred practice indicates that a slight forward twist should be constantly placed on the entering end 20a of the cable.

The indicating means 150 includes a pointer 160 which projects from the floating spreader head 72, as best shown in Fig. 6. The end 161 of this pointer 160 traverses an arcuate dial plate 162 secured by an attachment 163 to the crossbar 164 of the intermediate section 22, and by an attachment 166 to the semicylindrical wall 61. As the cable 20 is pulled across the spreader head 72, the spreader head will be caused to rotate by the helix of the cable. If the cable guide 21 is rotating at the same speed as the spreader head 72, the head 161 of the pointer 160 will remain in centralized relation to the dial plate 162. In a convenient manner of operating the device, the cable guide 21 may be rotated at substantially constant speed and the take-off spool 99, Fig. 1, may be driven at such speed by the variable speed drive 137 that the helix of the cable will cause the spreader head 72 to rotate in a manner to hold the pointer 160 in a substantially centralized relation to the dial 162. An operator at the control 138 of the variable speed drive 137 may observe the relative positions of the pointer 160 and the dial 162 and vary the forward travel of the cable in accordance with the requirements indicated by the change in relative positions of the pointer 160 and the dial 162.

I claim as my invention:

1. In a device of the character described for inserting a core in a pre-formed cable, the combination of: means defining a path of movement for said pre-formed cable; means for advancing said cable along said path of movement; a spreader head to separate the strands of said cable so as to form in said cable an opening accessible from the side thereof; means for supporting a core to a side of said path of movement of said cable; means to guide said core into said opening of said cable between adjacent separated strands thereof; and means for relative orienting of said guide means and said cable so that said guide means will follow the spiral of said cable as the same is advanced along said path of movement.

2. In a device of the character described for inserting a core in a pre-formed cable, the combination of: means defining a path of movement for said cable; means for advancing said cable along said path of movement; a spreader head to separate the strands of said cable so as to form in said cable an opening accessible from the side thereof; means for supporting a core to a side of said path of movement of said cable; means to guide said core into said opening of said cable between adjacent separated strands thereof; means for orienting said guide means so that it will follow the spiral of said cable as the same is advanced along said path of movement; and means for taking a core from said cable prior to the guiding of said first named core into said opening of said cable through a side of the cable.

3. In a device of the character described for inserting a core in a pre-formed cable, the combination of: means for supporting said cable; means for spreading strands of said cable without untwisting the same, so as to form a side opening leading into the core pace of the cable; means for guiding a core into said opening of said cable from the side of said cable; means to cause axial movement of said spreading means and said guiding means relative to said cable; and means to relatively rotate said cable and said guiding means so that said guiding means will follow the spiral of said cable.

4. In a device of the character described for inserting a core in a pre-formed cable, the combination of: means for supporting said cable; a spreader head insertable in said cable so as to form an opening in the cable accessible through a side portion thereof; means for guiding a core into said opening of said cable through the side of said cable; means to cause axial movement of said head and said guide means relative to said cable; means to relatively rotate said cable and said guiding means so that said guiding means will follow the spiral of said cable; and means for removing a core from said cable prior to the guiding of said first named core into said opening by said guide means.

5. In a device of the character described for inserting a core, in a preformed cable, the combination of: means for supporting said cable; a spreader head insertable in said cable from a side thereof; said head having a guide opening leading from a side thereof to the front end thereof within said cable; means for guiding a core into the outer end of said opening so that it will pass therethrough into the interior of said cable; means for producing an axial movement of said head and said guiding means relative to said cable; and means for producing a rotation of said head and said guiding means relative to said cable so that said head and said guiding means will follow the spiral of the strands of said cable.

6. In a device of the character described for inserting a core in a preformed cable, the combination of: means for supporting said cable; a spreader head insertable in said cable from a side thereof, said head having a first guide opening leading from the rear end to one side thereof and a second guide opening leading from a side thereof to the front end thereof; means for taking an old core from said cable through said first opening; means for guiding a new core into said cable through said second opening; means for causing said head and said guide means to move axially relative to said cable; and means to rotate said head and said guide means relative to said cable so as to follow the spiral of the strands of said cable.

7. In a device of the character described for inserting a core in a cable, the combination of: means for supporting a cable; a spreader head insertable in said cable from a side thereof, said head having a guide opening leading from a side thereof to the front end thereof within said cable; means for guiding a core into the outer end of said opening so that it will pass therethrough into the interior of said cable; means for producing an axial movement of said head and said guide means relative to said cable; means for producing a rotation of said head and said guide means relative to said cable so that said head and said guide means will follow the spiral of the strands of said cable; and means for taking an old core from said cable from a side thereof prior to the guiding of said first named core into said cable through said opening of said head.

8. In a device of the character described for inserting a core in a cable, the combination of: means for supporting a cable; a spreader head insertable in said cable so as to form an opening in the cable accessible through a side portion thereof, said head having spirally disposed channels through which the strands of said cable pass; means for guiding a core into said opening of said cable through the side of said cable; means to cause axial movement of said head and said guide means relative to said cable; and means to relatively rotate said cable and said guide means so that said guide means will follow the spiral of said cable.

9. In a device of the character described for inserting a core in a cable, the combination of: means for supporting a cable; a spreader head insertable in said cable so as to form an opening in the cable accessible through a side portion thereof; means for guiding a core into said opening of said cable through the side of said cable; means to cause axial movement of said head and said guide means relative to said cable; means to relatively rotate said cable and said guide means so that said guide means will follow the spiral of said cable; means for supporting a coil of said core from which it may be taken through said guide means to said opening of said cable; and means producing relative rotation of said supporting means and said guide means so that said core will not be twisted in said cable.

10. In a device of the character described for inserting a core in a cable, the combination of: means defining a path of movement for a cable; means for advancing said cable along said path of movement; a spreader head to separate the strands of said cable so as to form in said cable an opening accessible from the side thereof; means for supporting a core adjacent said path of movement of said cable; means to guide said core into said opening of said cable between adjacent separated strands thereof; means for rotating said guide means so that it will follow the spiral of said cable as the same is advanced along said path of movement; means for supporting a coil of said core from which said core may pass to said guide means; and means for moving said supporting means in an orbit around said cable in accordance with the rotation of said guide means so that said core will not be twisted in said cable.

11. In a device of the character described for inserting a core in a cable, the combination of: a cable guide having a pair of end portions and an intermediate portion; a support for said cable guide, permitting rotation of said cable guide on the longitudinal axis of a cable passed therethrough; a new core support mounted on one of said end portions; an old core support carried on the other of said end portions; a core guide means extending from said intermediate portion of said cable guide to said core support; a spreader head in said intermediate portion adapted to be inserted in said cable from a side thereof so as to spread the strands of said cable to form an opening from which an old core may be taken from said cable and in which a new core may be inserted in said cable; and means for axially moving and rotating said cable guide so that said head will follow the spiral of the strands of said cable and so that said core supports will revolve around the axis of said cable.

12. In a device of the character described for inserting a core in a cable, the combination of: a cable guide having a pair of end portions and an intermediate portion; a support for said cable guide, permitting rotation of said cable guide on the longitudinal axis of a cable passed therethrough; a new core support mounted on one of said end portions; an old core support carried on the other of said end portions; a core guide means extending from said intermediate portion of said cable guide to said core support; a spreader head in said intermediate portion adapted to be inserted in said cable from a side thereof so as to spread the strands of said cable to form an opening from which an old core may be taken from said cable and in which a new core may be inserted in said cable; means for axially moving and rotating said cable guide so that said head will follow the spiral of the strands of said cable and so that said core supports will revolve around the axis of said cable; and a counterbalance connected to said cable guide for counterbalancing the eccentric weight of said core supports.

13. In a device of the character described, the combination of: means defining a position for a cable to be operated upon; spreading and guide means forming a side opening in said cable and guiding a core through said opening; means for producing such relative movement of said cable and said spreading and guide means that said side opening will follow the spiral of said cable; and means for orienting said core.

14. In a device of the character described, the combination of: means defining a position for a cable to be operated upon; spreading and guide means forming a side opening in said cable and guiding a core through said opening; means for producing such relative movement of said cable and said spreading and guide means that said side opening will follow the spiral of said cable; means for orienting said cable; and means for orienting said core.

15. In a device of the character described, the combination of: means defining a position for a cable to be operated upon; spreading and guide means forming a side opening in said cable and guiding a core through said opening; means for producing such relative movement of said cable and said spreading and guide means that said side opening will follow the spiral of said cable; and means for orienting said cable.

16. In a device of the character described, the combination of: means defining a position for a cable to be operated upon; spreading and guide means forming a side opening in said cable and guiding a core through said opening; means for producing such relative movement of said cable and said spreading and guide means that said side opening will follow the spiral of said cable; and indicating means to show that said movement of said spreading and guide means is following the natural spiral of said cable.

17. In a device of the character described, the combination of: means defining a position for a cable to be operated upon; floating spreader means to form a side opening in said cable; means to guide a core which passes through said side opening; means to give said spreader means and said cable a relative longitudinal movement, said spreader means being so formed as to follow the spiral of said cable; means to give said guide means and said cable such relative helical movement that the spiral of the cable will be followed by said guide means; and indicating means cooperatively associated with said guide means and said spreader means to show the relative angular positions of said spreader means and said guide means around the axis of said cable.

18. In a device of the character described, the combination of: means defining a position for a cable to be operated upon; floating spreader means to form a side opening in said cable; means to guide a core which passes through said side opening; means to give said spreader means and said cable a relative longitudinal movement, said spreader means being so formed as to follow the spiral of said cable; indicating means cooperatively associated with said guide means and said spreader means to show the relative angular positions of said spreader means and said guide means around the axis of said cable; and variable motivating means to give said guide means and said cable such relative helical movement that said relative angular positions thereof will remain substantially constant.

19. The method of replacing an old core in a cable with a new core, comprising: separating strands of said cable so as to form in said cable an opening leading out at one side of said cable; progressively spreading said strands so as to cause said opening to move lengthwise of said cable and so as to cause relative rotation of said opening and said cable so that it will follow the spiral defined by adjacent strands thereof; taking the old core from said cable through said side opening thereof; and feeding a new core into said cable through said side opening thereof.

20. The method of replacing an old core in a cable with a new core, comprising: separating strands of said cable so as to form in said cable an opening leading out at one side of said cable; progressively spreading said strands so as to cause said opening to move lengthwise of said cable and so as to cause relative rotation of said opening and said cable so that it will follow the spiral defined by adjacent strands thereof; taking the old core from said cable through said side opening thereof; feeding a new core into said cable through said side opening thereof; and orienting said new core so that it will not twist as it is fed into said cable.

21. The method of replacing an old core in a cable with a new core, comprising: separating strands of said cable so as to form in said cable a first opening leading out at one side of said cable; spreading strands of said cable so as to form in said cable a second opening leading out at one side of said cable; progressively separating said strands so as to cause said openings to move relatively lengthwise of said cable and to rotate relative to the axis of the cable so as to follow the spiral defined by adjacent strands; taking the old core from said cable through said first side opening thereof; and feeding a new core into said cable through said second side opening thereof.

22. The method of replacing an old core in a cable with a new core, comprising; separating strands of said cable so as to form in said cable a first opening leading out at one side of said cable; spreading strands of said cable so as to form in said cable a second opening leading out at one side of said cable; progressively separating said strands so as to cause said openings to move lengthwise of said cable and to rotate relative to the axis of the cable so as to follow the spiral defined by adjacent strands; taking the old core from said cable through said first side opening thereof; feeding a new core into said cable through said second side opening thereof; and orienting said cores as they are respectively taken from and fed into said cable so that the same will not be twisted.

GEORGE H. ENNIS.

CERTIFICATE OF CORRECTION.

Patent No. 2,216,189. October 1, 1940.

GEORGE H. ENNIS.

It is hereby certified that error appears in the printed specification of the above numbered patent requiring correction as follows: Page 2, first column, line 55, for "ond" read --and--; page 4, second column, line 19, claim 2, strike out the words "through a side of the cable" and insert the same after "cable" in line 17, same claim; line 25, claim 3, for "pace" read --space--; and that the said Letters Patent should be read with this correction therein that the same may conform to the record of the case in the Patent Office.

Signed and sealed this 10th day of December, A. D. 1940.

(Seal)

Henry Van Arsdale,
Acting Commissioner of Patents.